United States Patent
Lorenzo et al.

(10) Patent No.: US 7,941,132 B2
(45) Date of Patent: May 10, 2011

(54) METHOD AND APPARATUS FOR DYNAMIC MENUING OF APPLICATIONS IN A MOBILE COMMUNICATION DEVICE

(75) Inventors: Geydi M. Lorenzo, Miramar, FL (US); Jeffrey B. Shudark, Cumming, GA (US)

(73) Assignee: Motorola Mobility, Inc., Libertyville, IL (US)

( * ) Notice: Subject to any disclaimer, the term of this patent is extended or adjusted under 35 U.S.C. 154(b) by 757 days.

(21) Appl. No.: 11/614,262

(22) Filed: Dec. 21, 2006

(65) Prior Publication Data

US 2008/0153473 A1    Jun. 26, 2008

(51) Int. Cl.
*H04M 3/00* (2006.01)
*H04M 1/00* (2006.01)
(52) U.S. Cl. ..................... 455/418; 455/550.1
(58) Field of Classification Search .......... 455/403, 455/412.1, 414.1, 418, 550.1, 566
See application file for complete search history.

(56) References Cited

U.S. PATENT DOCUMENTS

| | | | |
|---|---|---|---|
| 7,590,430 B1* | 9/2009 | Urbanek | 455/566 |
| 2004/0034853 A1* | 2/2004 | Gibbons et al. | 717/174 |
| 2004/0207658 A1* | 10/2004 | Awada et al. | 345/747 |
| 2007/0288883 A1* | 12/2007 | Soroker et al. | 717/100 |

OTHER PUBLICATIONS

Sun Microsystems, Inc., "J2ME(TM) Content Handler API: Version 1.0 for the Java(TM) 2 Platform, Micro Edition", Jun. 2005, pp. 1-2, Santa Clara, California, USA.

* cited by examiner

*Primary Examiner* — Michael T Thier
(74) *Attorney, Agent, or Firm* — Scott M. Garrett; Sylvia Chen (57) ABSTRACT

A mobile communication device (100) downloads an application file (300), which includes an application (302) and a menu parameter set (306). The mobile communication device uses custom menu categories (502), and the application is delivered using standardized categories. The mobile communication device maps the application's standardized category to one of the custom categories, and adds the application name to the custom category.

17 Claims, 5 Drawing Sheets

METHOD AND APPARATUS FOR DYNAMIC MENUING OF APPLICATIONS IN A MOBILE COMMUNICATION DEVICE

TECHNICAL FIELD

This invention relates in general to user interface elements in mobile communication devices, and more particularly to the display of items stored in a memory of the mobile communication device.

BACKGROUND OF THE INVENTION

Mobile communication devices are in widespread use throughout metropolitan regions of the world, and many other places in between. In developing parts of the world, where land line telephony has not yet been installed, wireless mobile telephony systems are being installed rather than land lines. In correspondence with advances in computing power made in microprocessors, mobile communication devices have developed into device that do more than simply support wireless mobile telephony. Many present-day mobile communication devices have sophisticated user interfaces including photo and video capable displays. They are capable of running a variety of applications, as well.

Many manufacturers now design mobile communication devices to support Java 2 Micro Edition, which is an execution environment for portable or bytecode in memory constrained devices. The presence of such an execution environment in mobile communication devices has led to the development of many applications by the device manufacturers, communication service operators, and third party developers. To provide access to the applications, the mobile communication device typically provides an application menu. The application menu typically a simple list of the application names through which the user can scroll to select the desired application to launch. The application names are displayed in the order in which the applications were installed in the device. For a small number of applications, a simple list is practical. However, as the amount of memory in mobile communication devices increases, users will have the ability to install more applications, and simple list will be too cumbersome to scroll through. A categorized menu may be implemented, with predefined categories, allowing the user to select the category into which the application is to be menued. However, such fixed menuing schemes prevent application developers from dictating how an application may be menued, and subsequently launched. Therefore there is a need for an enhanced menuing scheme that allows dynamic self-configuring menuing when installing applications.

SUMMARY OF THE INVENTION

The invention generally provides customized menuing of applications received at a mobile communication device. The mobile communication device receives an application file. The application file includes an application and a descriptor. The descriptor includes a menu parameter set which includes the menuing attributes. In the menu parameter set there is at least a standardized menu category indicated and an application name. The application file is parsed to obtain and locate the contents. The application is stored in the mobile communication device, and the standardized application category is mapped to a custom menu category. The mobile communication device then adds the application name to the custom menu category in a menu structure of the mobile communication device.

In another embodiment of the invention, the invention provides a mobile communication device including a controller, a memory operatively coupled to the processor, a display operatively coupled to the processor, and a receiver operatively coupled to the processor. The processor is wherein the processor is configured to display an application menu on the display. The application menu has a plurality of customized categories. The processor is further configured to receive an application file over the receiver. The application file includes an application to be stored in the mobile communication device and an associated menu parameter set in a descriptor associated with the application. The menu parameter set includes at least a standardized application category and an application name. The processor parses the application file to obtain the application and menu parameter set, and then stores the application in the memory. To make the application appear in the appropriate custom menu category, the processor maps the standardized application category to a customized menu category, and adds the application name to the custom menu category so that the application name is presented to a user of the mobile communication device upon viewing the custom menu category of the customized menu.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward.

Figure 1:
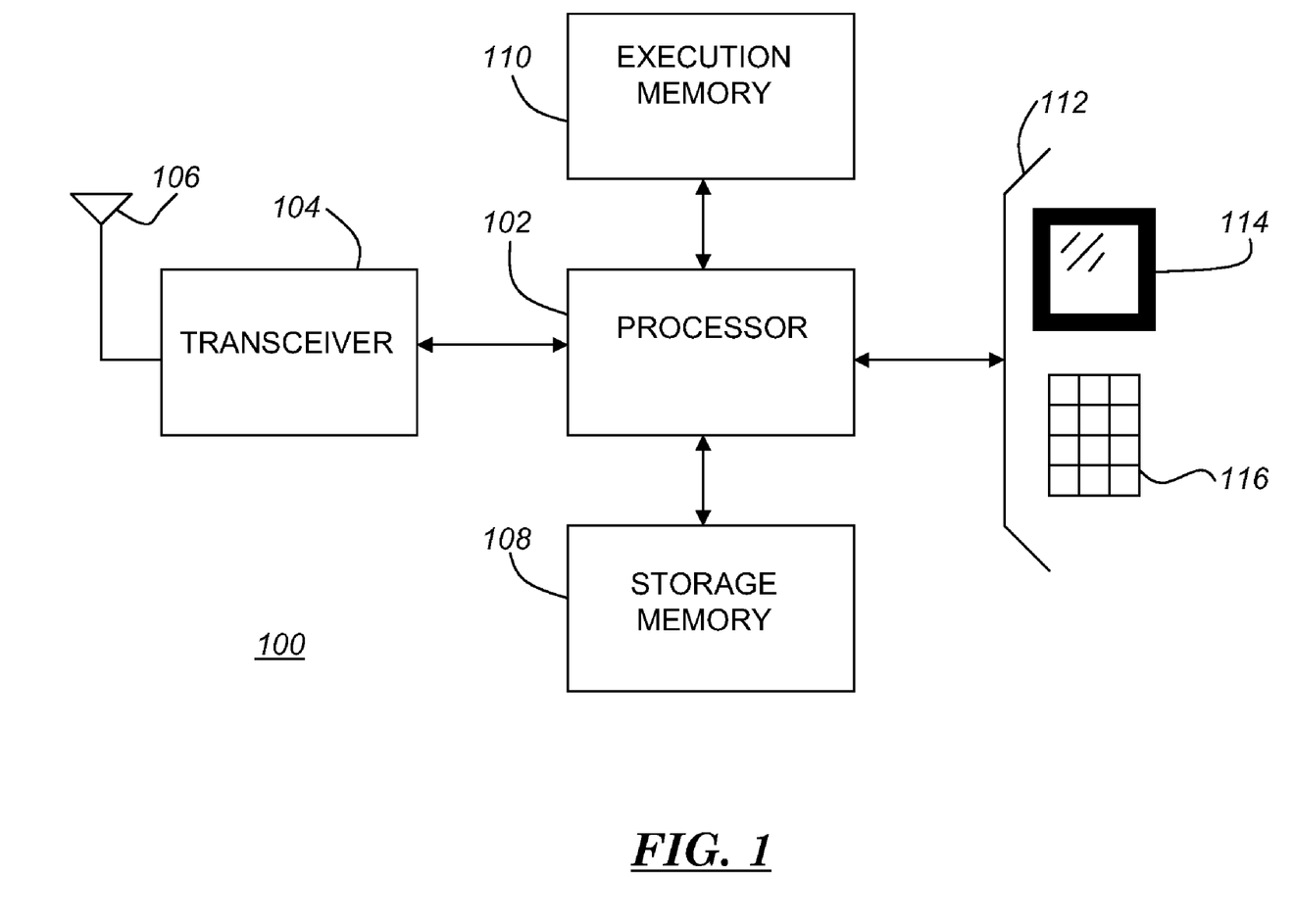
FIG. 1 shows a block schematic diagram of a mobile communication device, in accordance with an embodiment of the invention.

Referring now to FIG. 1, there is shown a block schematic diagram of a mobile communication device 100, in accordance with an embodiment of the invention. The mobile communication device is a device capable of supporting wireless mobile communication, including voice communication, data communication, and messaging communication. The mobile communication device 100 includes a central processing element 102, abstracted here as a single entity but which may be implemented as one or more actual processors including microprocessors, digital signal processors, and so on, as is known in the art. The processor executes instruction code, and provides hardware interfaces, registers, timing, interrupt, and other functions to carry out the operation instructed by the software it is executing. The processor is operably coupled to a transceiver 104. The transceiver comprises a transmitter function and a receiver function for transmitting and receiving radio frequency (RF) signals via an antenna 106. The transceiver performs the necessary filtering, amplification, modulation and demodulation, mixing, down-mixing, and related RF functions. The processor is further operably coupled to memory elements, including a storage memory element 108 and an execution memory 110. The storage memory 108 is where files, records, and other data are stored, and includes read only memory, reprogrammable memory, and may further include bulk storage memory such as hard disk memory. The execution memory 110 includes random access memory, scratchpad memory, and may include non-volatile memory for storing state parameters, variables and other data or information that may need to be kept in a persistent state. The execution memory is typically loaded with instruction code at boot up to instantiate the operating system and system applications for operating the mobile communication device. Generally, an application file is installed by being stored in the storage memory 108. When the application is to be run, it is instantiated in the execution memory 110. The mobile communication device further comprises a user interface 112, which includes display elements 114 and input elements 116. Given that the mobile communication device is operable for voice communication, the mobile communication device will further will include voice and audio elements for processing voice signals. The display element 114 includes a graphical display for presenting information to the user of the mobile communication device in visually perceptive form. The input elements include a standard keypad, and may further include other buttons and navigation devices for inputting information entering commands, making selections, and so on. The display is used for displaying, among other information, a menu of applications. The applications may be presented as selectable items, such that when the user selects a given application name as displayed the mobile communication device launches the application.

Figure 2:
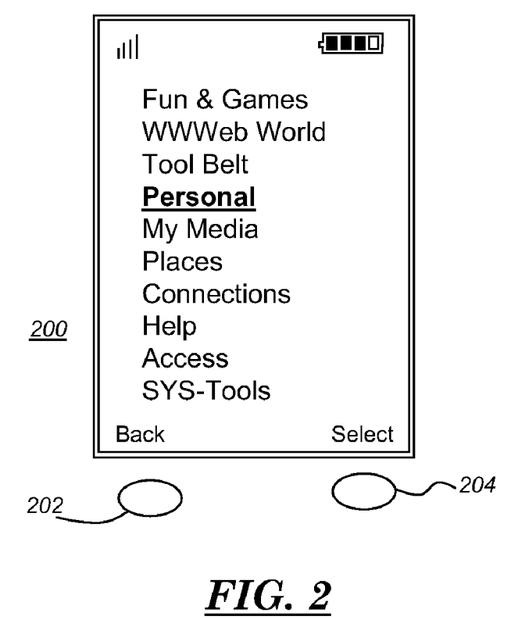
FIG. 2 shows a menu display on a graphical display of a mobile communication device, in accordance with an embodiment of the invention.

Referring now to FIG. 2, there is shown a menu display 200 on a graphical display of a mobile communication device, in accordance with an embodiment of the invention. The display shows, among other things, a list of customized application category names, or simply categories, including as examples, "Fun & Games," "WWWeb World," "Tool Belt," "Personal," "My Media," "Places," "Connections," "Help," "Access," and "SYS-Tools." As shown, the category of "Personal" is highlighted. At the bottom of the display on the left and right sides are soft keys 202, 204 for "Back" and "Select," respectively. These choices are located in correspondence with the buttons, which, when pressed, cause the mobile communication device to perform the indicated action. A conventional navigation means is used to scroll through the list to the desired category. As shown, if the button corresponding to "Select:" is pressed, then the user is selecting the "Personal" applications category, and the mobile communication device will then display a menu of the applications assigned to or otherwise associated with the "Personal" category. These customized categories are selected by the manufacturer, the service provider, or a third party. They may reflect well-known brand names in a brand-themed mobile communication device. For example, a company may partner with a mobile communication device manufacturer to design a mobile communication device with colors, patterns, logos, icons, and/or user interface elements that remind users of the company's brand or brands. Since the customized categories of a themed mobile communication device may not be known to developers, and since different customized mobile communication devices can have different customized categories, the invention allows developers to categorize their applications using standardized application categories which are then mapped to the appropriate customized category in the mobile communication device upon downloading and storing the application.

Figure 3:
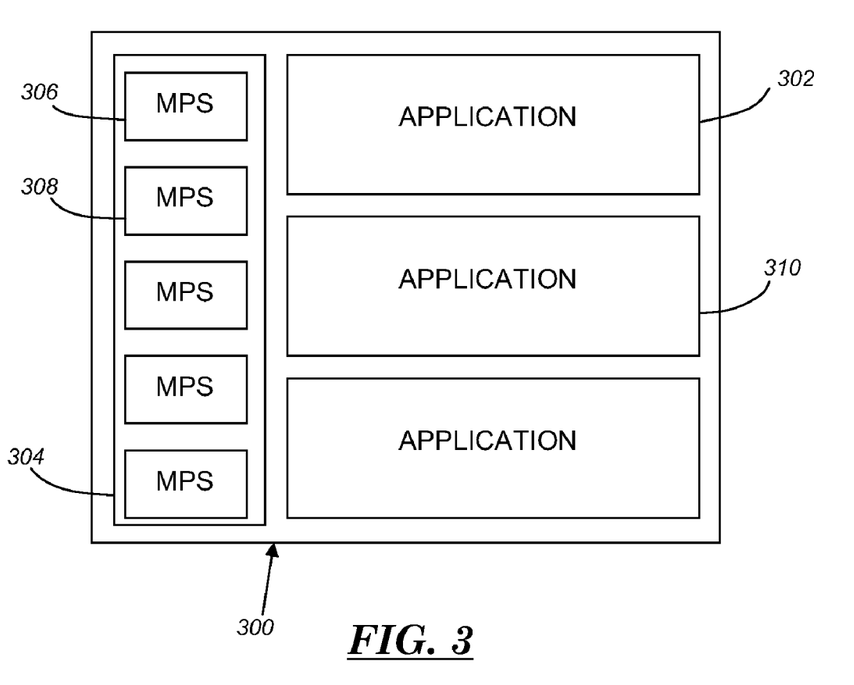
FIG. 3 shows an application file, in accordance with an embodiment of the invention.

Referring now to FIG. 3, there is shown therein an application file 300, in accordance with an embodiment of the invention. The application file is a file having several related parts. The archive includes one or more applications 302, 310. The application comprises instruction code, and may further include associated data structures, classes, libraries, and other software elements, and may be in compressed or uncompressed form. In one embodiment of the invention, the application may be a Java MIDlet or Java archive. The application file 300 further contains a descriptor file, or more simply, a descriptor 304. The descriptor is a text file which is used to inform the mobile communication device of attributes and other information associated with the application or applications. According to the invention, the descriptor includes one or more menu parameter sets 306, 308. the descriptor may be, for example, a Java archive descriptor. Each menu parameter set is associated with one application and contains several menu parameters. Among the menu parameters there are a standardized application category and an application name. The standardized application category is a data field listing one of several predefined and published or standardized application categories. These standardized application categories are known to application developers and others. When the application is published and made available, the application developer has identified which of the standardized application categories to assign to the application, and written the chosen standardized application category into the menu parameter set. The standardized application category is used by the mobile communication device to map to a customized application category used by the mobile communication device. The application name is the text used in the customized category to display to the user.

Other menu parameters may also be included. For example, the application name may be provided in several languages. Upon storing the application in the mobile communication device, the mobile communication device will then select the application name having the most compatible language as determined by a language preference of the mobile communication device. The menu parameter set may further include one or more launch parameters. A launch parameter is initiation data that is passed to the application upon invocation, causing the application to launch in a specific configuration. The configuration may include user interface elements, libraries, or other elements. Using different launch parameters can make the application appear to be a different application. For example, a web browser can be used to access the Internet, but can also be used to view media stored locally on the mobile communication device such as pictures and video content. The application can then be launched with one launch parameter of parameters to instantiate it as a web browser, and launched with different launch parameters to instantiate it as a media viewer.

Since multiple applications may be present in the application file, the menu parameter set may further include an application number field indicating to which application the present menu parameter set is associated. Since the application may be configured differently by the use of launch parameters, it may be reused and assigned to more than one category, requiring different menu parameter sets for each category with which the application is to be associated and displayed. Furthermore, the application may be menued using different names in the different configurations. Using different menu parameter sets for each configuration therefore allows the use of different application names in addition to different application categories.

The menu parameter set may further include a position field which indicates a position preference in the menu. For example, an application distributed by the brand owner of a brand-themed mobile communication device may desire to have the application listed first in its corresponding menu. The mobile communication device may have some discretion as to how the order is arranged, treating the position field as a preference that may yield to other applications vying for the same menu position.

Figure 4:
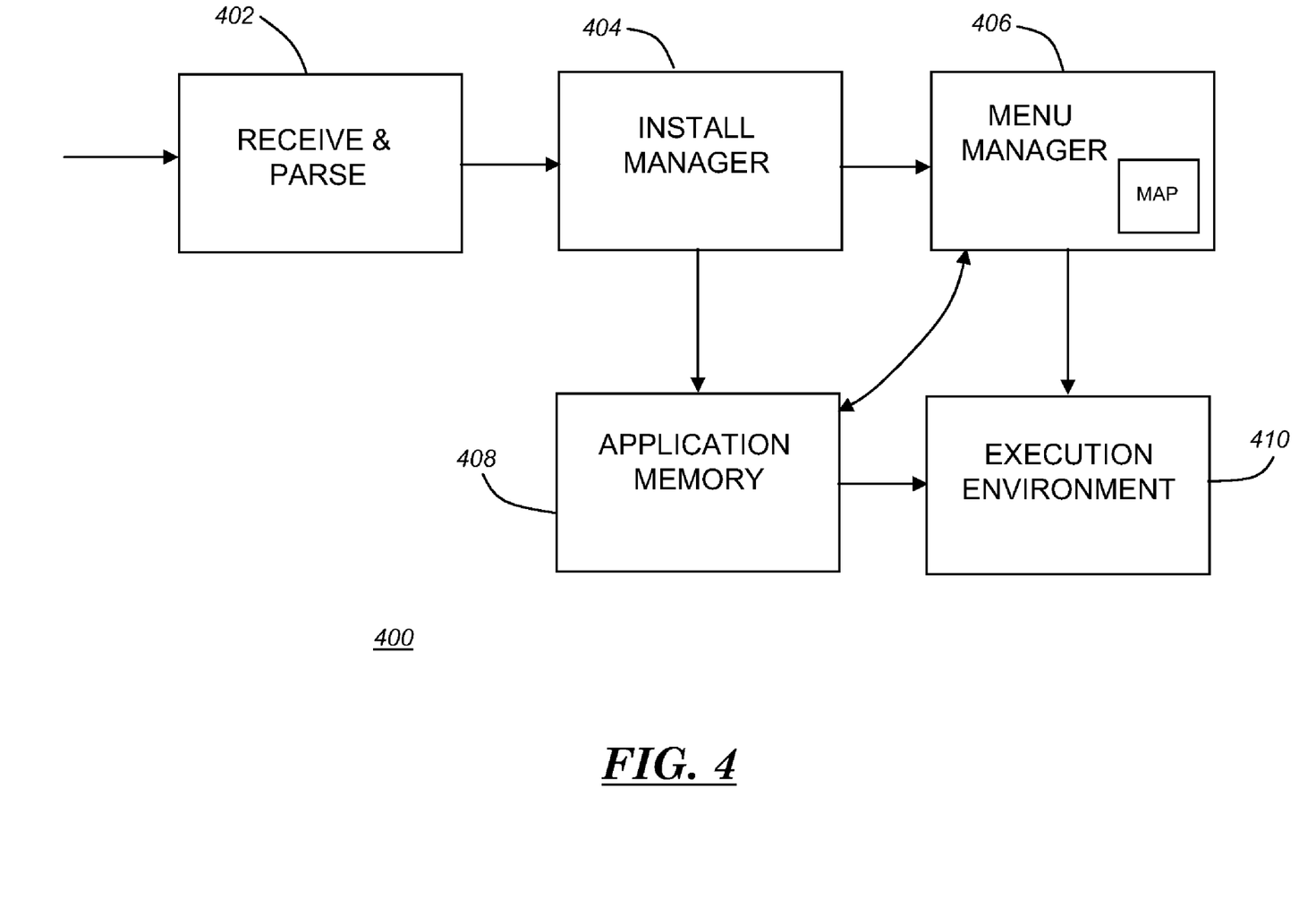
FIG. 4 shows a process diagram of method of dynamic menuing, in accordance with an embodiment of the invention.

Referring now to FIG. 4, there is shown a process diagram 400 of method of dynamic menuing, in accordance with an embodiment of the invention. The process begins upon receiving an application file which is comprised in accordance with the teachings of FIG. 3 and the accompanying text. The processes shown here are represented at a high level of abstraction. There may be some overlap in operation in an actual implementation of the processing functions illustrated here. The download may be commenced as a result of the user of the mobile communication device requesting or causing the mobile communication device to download the application for installation, or it may be pushed to the mobile communication device by a communication service provider. The first process is therefore to receive and parse the received file (402). The application file is received in parts via a data transfer protocol. As parts of the file are received they are concatenated together in the proper order. The file is also parsed so that the various parts of the file can be identified and located. In particular the applications and the menu parameter sets are identified. As those portions of the file are identified, the responsibility for handling the file passes to an install manager function (404).

The install manager stores the application, along with any associated data, libraries, classes, and so on, in the application memory 408. The application memory is a non-volatile memory for storing the application in its installed form, so it can be called for instantiation and execution later. In accordance with the invention, the install manager may provide a menu manager 406 with the menuing parameters of the menu parameter set and the location of the application in the application memory. The menuing manager controls the structure of the customized application menu data, which is used to display the menu of applications to the user of the mobile communication device. The menuing manager receives the menuing attributes, including, the standardized category of the application and the application name. Other menuing attributes may be included, such as associated launch parameters, menu position preference, and application names in additional languages.

Since the mobile communication device in the present invention uses a custom menu, the menu manager uses a map for mapping the standardized menu categories to the customized menu categories. The menu manager maintains a menu data structure in non-volatile memory which includes the names of the application in their appropriate custom menu category, along with any launch parameters. Once the menu data structure is updated, the application can be run by the user of the mobile communication device by selecting the application name from the application menu presented to the user. Once the application is selected by the user, it is called up and instantiated in an execution environment 410. The application code is loaded from the application memory into execution memory, along with any necessary data, and configured in accordance with any launch parameters associated with the application from the menu location at which it was selected. The execution environment may be a virtual machine environment for executing portable code, such as Java byte code.

Figure 5:
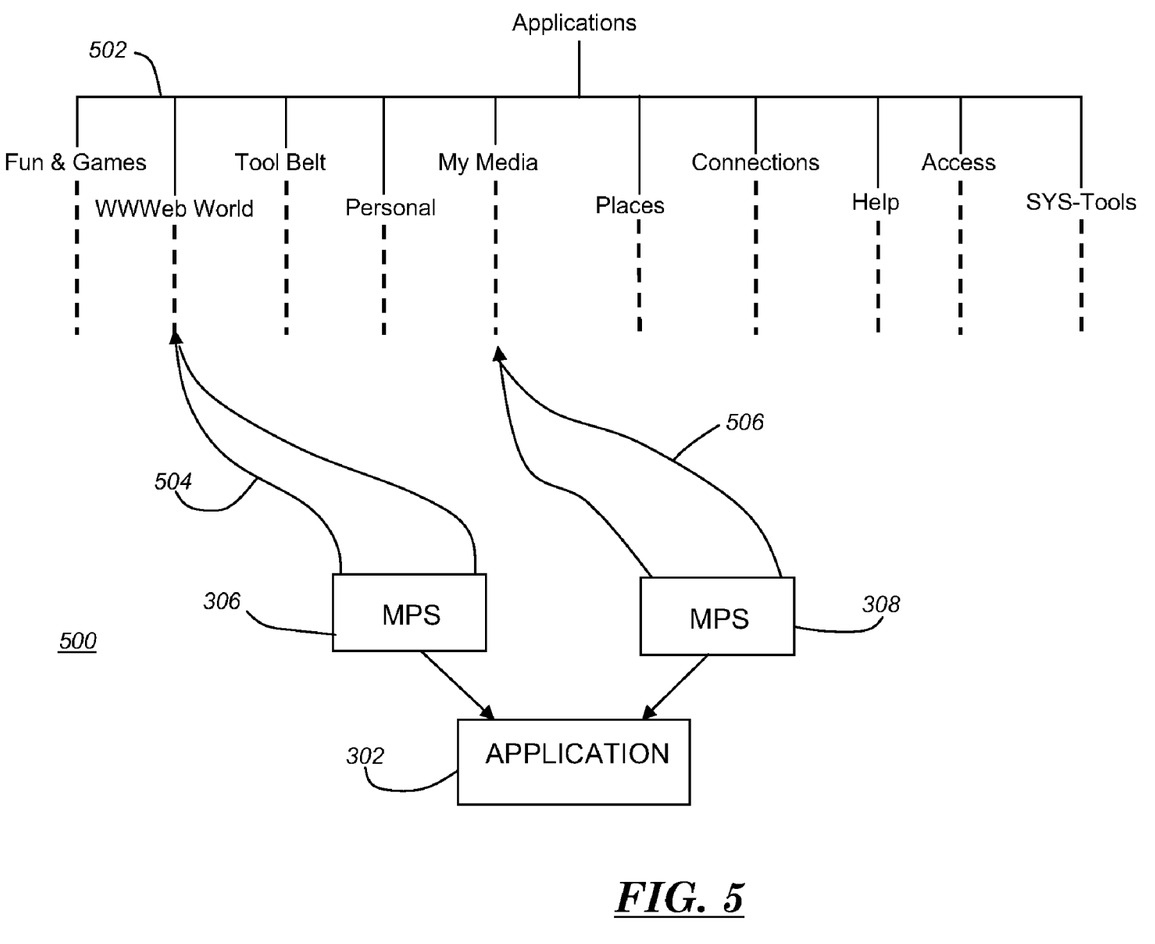
FIG. 5 shows diagram illustrating dynamic menuing, in accordance with an embodiment of the invention.

FIG. 5 shows a diagram illustrating dynamic menuing 500, in accordance with an embodiment of the invention. A menu structure 502 is maintained in the mobile communication device. As shown the present menu structure is an applications menu structure, including several customized application categories or sub-menus. An application file includes a first menu parameter set 306 and a second menu parameter set 308, each of which are associated with an application 302. The menu parameter sets include menuing attributes for the application 302. The first menu parameter set indicates that a menu entry be created in a first customized menu 504, and the second menu parameter set indicates that a menu entry be created in a second customized menu 506. For example, an application can be used as a web browser and also used for viewing media stored on the mobile communication device. Therefore one application name is placed in the "WW Web World" menu, for example, and a different application name may be placed in the "My Media" menu. Each menuing instance of the application may have associated launch parameters so that the application is launched appropriately.

Figure 6:
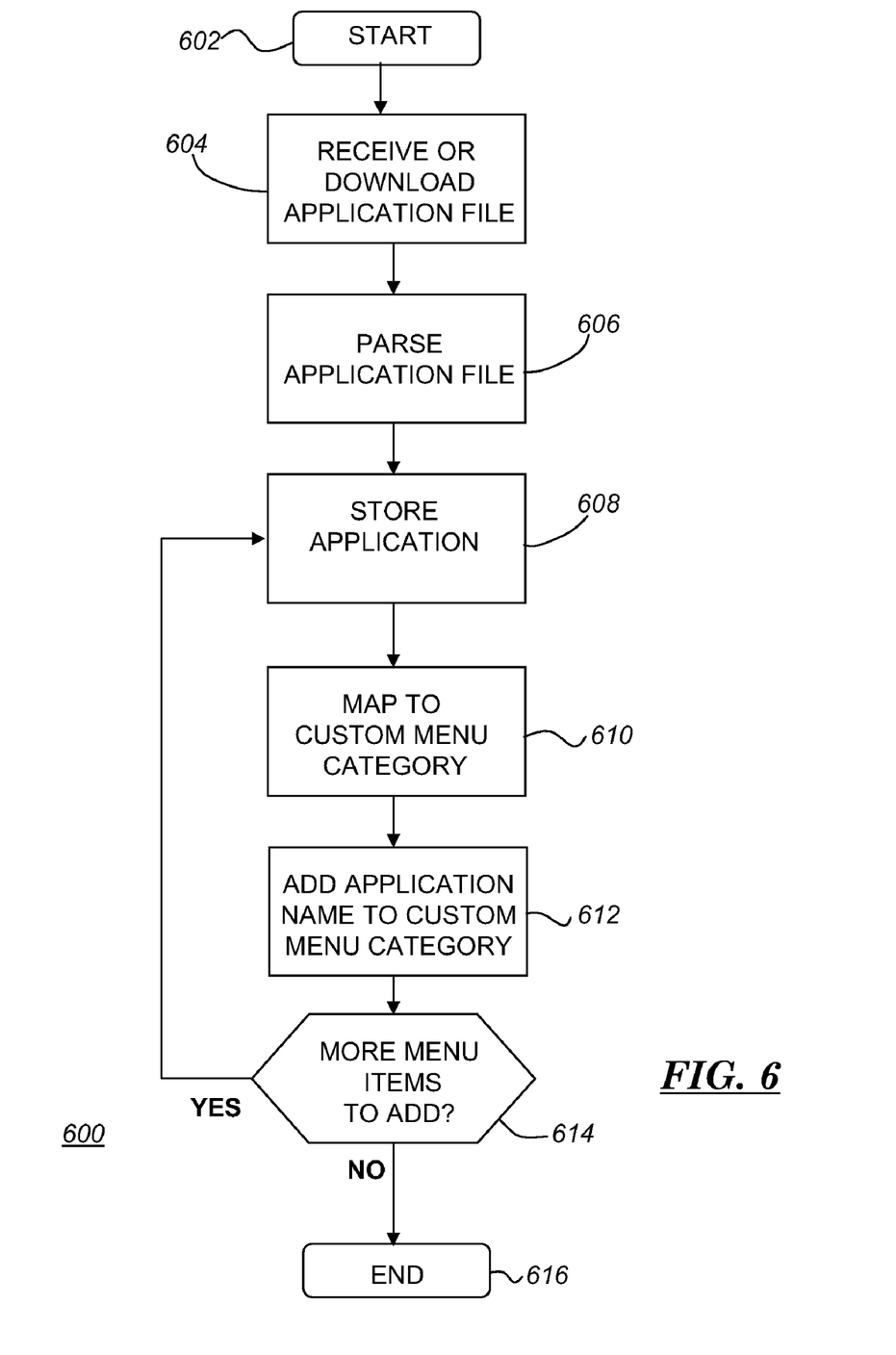
FIG. 6 shows a flow chart diagram of a method of menuing an application, in accordance with an embodiment of the invention.

Referring now to FIG. 6, there is shown a flow chart diagram 600 of a method of dynamically menuing an application, in accordance with an embodiment of the invention. It is dynamic in the sense that the menu into which the application name will be placed is not initially known, and is determined at the time of downloading and storing the application in the mobile communication device. At the start 602 the mobile communication device is powered on and in a normal operating mode, ready to commence with the method. First, the mobile communication device receives or downloads an application file 604, such as an application file in accordance with FIG. 3. The application file may be requested by the mobile communication device, or it may be pushed to the mobile communication device without it having been requested by the mobile communication device. Upon receiving the application file, the mobile communication device commences parsing the application file 606 to determine and locate its contents. The application file will contain an application and a descriptor containing a menu parameter set. Once the application file is parsed, the application may be stored or installed 608 in the mobile communication device's memory. The application's location is noted for association with the menu information. Also subsequent to parsing the application file, the mobile communication device locates the menu parameter set associated with the application, and maps the standardized application category to a custom menu category 610. Once the appropriate custom menu category has been determined, the mobile communication device adds the application name indicated in the menu parameter set to the custom menu category 612. Furthermore, the mobile communication device also associates any launch parameters with the application name so that the launch parameters will be used to launch the application when selected from the custom menu. Upon adding the application name, the mobile communication device may select from two or more application names in different languages. The mobile communication device may also add the application name into a designated position in the menu, as indicated by the menu parameter set. Once the application is stored, and the menu updated, the mobile communication device checks to see if there are any other applications or menu parameter sets to be processed 614. If so, then the process commences again. If not, then the process ends 616.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for dynamically menuing applications downloaded to a mobile communication device, comprising:
   receiving an application file including an application to be stored in the mobile communication device and an application descriptor associated with the application, the application descriptor listing a menu parameter set including at least a standardized application category, an application name of the application to be stored in the mobile communication device, and a first launch parameter and a second launch parameter, wherein the first launch parameter causes the application to be launched in a different configuration than the second launch parameter;
   parsing the application file to obtain the application and the menu parameter set of the descriptor;
   storing the application in the mobile communication device;
   mapping the standardized application category to a custom menu category of a customized menu of the mobile communication device;
   adding the application name to the custom menu category so that the application name is presented to a user of the mobile communication device upon viewing the custom menu category of the customized menu:
   associating the first launch parameter and the second launch parameter with the application name in the mobile communication device;
   launching the application using the first launch parameter upon the user selecting the application name from the standardized application category; and
   launching the application using the second launch parameter upon the user selecting the application name in the custom menu category.

2. A method for dynamically menuing applications as defined in claim 1, wherein the application is a first application, the menu parameter set is a first menu parameter set, application file further includes a second application, the application descriptor further includes a second menu parameter set, and wherein first and second menu parameter sets are associated with the first and second applications as indicated by an application number field in the first and second menu parameter sets, and wherein the parsing, storing, mapping, and adding are performed for both the first and second applications using their respective first and second menu parameter sets.

3. A method for dynamically menuing applications as defined in claim 1, wherein the menu parameter set further includes a position field for indicating a position of the custom menu category, and adding the application name to the custom menu category comprises adding the application name to the custom menu category at the position indicated by the position field.

4. A method for dynamically menuing applications as defined in claim 1, wherein the application is a portable code application.

5. A method for dynamically menuing applications as defined in claim 1, wherein the menu parameter set further includes the name of the application in a plurality of languages, and adding the application name to the custom menu category includes adding the name of the application based on a language preference of the mobile communication device.

6. A method for dynamically menuing applications as defined in claim 1, wherein the menu parameter set is a first menu parameter set, the descriptor further includes a second menu parameter set including a second standardized application category, a second application name, and a third launch parameter, the method further comprises:
   mapping the second standardized application category to a second custom menu category of the customized menu of the mobile communication device;
   associating the third launch parameter with the second application name in the mobile communication device; and
   adding the second application name to the second custom menu category so that the second application name is presented to a user of the mobile communication device upon viewing the second custom menu category of the customized menu.

7. A mobile communication device, comprising:
   a processor;
   a memory operatively coupled to the processor;
   a display operatively coupled to the processor;
   a receiver operatively coupled to the processor;
   wherein the processor is configured to:
      display an application menu on the display, the application menu having a plurality of customized categories;
      receive an application file over the receiver, the application file including an application to be installed in the mobile communication device and an associated menu parameter set in a descriptor associated with the application, the menu parameter set including at least a standardized application category, an application name, and at least two launch parameters, wherein a first launch parameter causes the application to be launched in a first configuration and a second launch parameter causes the application to be launched in a second configuration:
      parse the application file to obtain the application and the menu parameter set;
      store the application in the memory;
      map the standardized application category to a customized category;
      add the application name to the customized category so that the application name is presented to a user of the mobile communication device upon viewing the customized category of the application menu;
      associate the first launch parameter and the second launch parameter with the application name in the mobile communication device;
      launch the application in the first configuration using the first lauch parameter upon the user selecting the application name in the standardized application category and
      launch the application in the second configuration using the second launch parameter upon the user selecting the application name in the customized category.

8. A mobile communication device as defined in claim 7, wherein the application is a first application, the menu parameter set is a first menu parameter set, application file further includes a second application, the descriptor further includes a second menu parameter set, and wherein first and second menu parameter sets are associated with the first and second applications as indicated by an application number field in the first and second menu parameter sets, and wherein the processor is configured to:
   parse the application file;
   store the first and second applications;
   map the first and second standardized application categories from the first and second menu parameter sets to first and second customized categories, respectively; and add the first and second application names to the first and second customized categories, respectively.

9. A mobile communication device as defined in claim 7, wherein the menu parameter set further includes a position field for indicating a position in the customized category, and the processor is configured to add the application name to the customized category at the position indicated by the position field.

10. A mobile communication device as defined in claim 7, wherein the application is in the form of portable code, and the mobile communication device provides a virtual machine execution environment for executing the portable code.

11. A mobile communication device as defined in claim 7, wherein the descriptor includes the name of the application in at least two languages, and the processor is configured to add the name in the language corresponding to a language preference of the mobile communication device.

12. A mobile communication device as defined in claim 7, wherein the menu parameter set is a first menu parameter set, the descriptor further includes a second menu parameter set including a second standardized application category, a second application name, and a third launch parameter, and the processor is further configured to:
- map the second standardized application category to a second customized category of the application menu of the mobile communication device;
- associate the third launch parameter with the second application name in the mobile communication device; and
- add the second application name to the second customized category so that the second application name is presented to a user of the mobile communication device upon viewing the second customized category of the application menu.

13. A method of storing an application in a mobile communication device, comprising:
- downloading an application file to the mobile communication device, the application file including an application to be stored in the mobile communication device and an application descriptor associated with the application, the application descriptor listing a menu parameter set including at least a standardized application category, an application name of the application to be stored in the mobile communication device, and at least two launch parameters, wherein a first launch parameter causes the application to be launched in a first configuration and a second launch parameter causes the application to be launched in a second configuration;
- parsing the application file at the mobile communication device to obtain the application and the menu parameter set of the application descriptor;
- storing the application in an application memory of the mobile communication device;
- mapping the standardized application category to a custom menu category of a customized menu of the mobile communication device;
- adding the application name to the custom menu category so that the application name is presented to a user of the mobile communication device upon viewing the custom menu category of the customized menu; and
- presenting the application name in the custom menu category to a user of the mobile communication device to allow the user to select the application:
- associating the first launch parameter and the second launch parameter with the application name in the mobile communication device;
- launching the application using the first launch parameter upon the user selecting the application name in the standardized application category; and
- launching the application using the second launch parameter upon the user selecting the application name in the custom menu category.

14. A method of storing an application in a mobile communication device as defined in claim 13, wherein the application is a first application, the menu parameter set is a first menu parameter set, application file further includes a second application, the application descriptor further includes a second menu parameter set, and wherein first and second menu parameter sets are associated with the first and second applications as indicated by an application number field in the first and second menu parameter sets, and wherein the parsing, storing, mapping, and adding are performed for both the first and second applications using their respective first and second menu parameter sets.

15. A method of storing an application in a mobile communication device as defined in claim 13, wherein the menu parameter set further includes a position field for indicating a position within the custom menu category, and adding the application name to the custom menu category comprises adding the application name to the custom menu category at the position indicated by the position field.

16. A method of storing an application in a mobile communication device as defined in claim 13, wherein the application is a portable code application.

17. A method of storing an application in a mobile communication device as defined in claim 13, wherein the menu parameter set further includes the name of the application in a plurality of languages, and adding the application name to the custom menu category includes adding the name of the application based on a language preference of the mobile communication device.

* * * * *